Figure 1A:
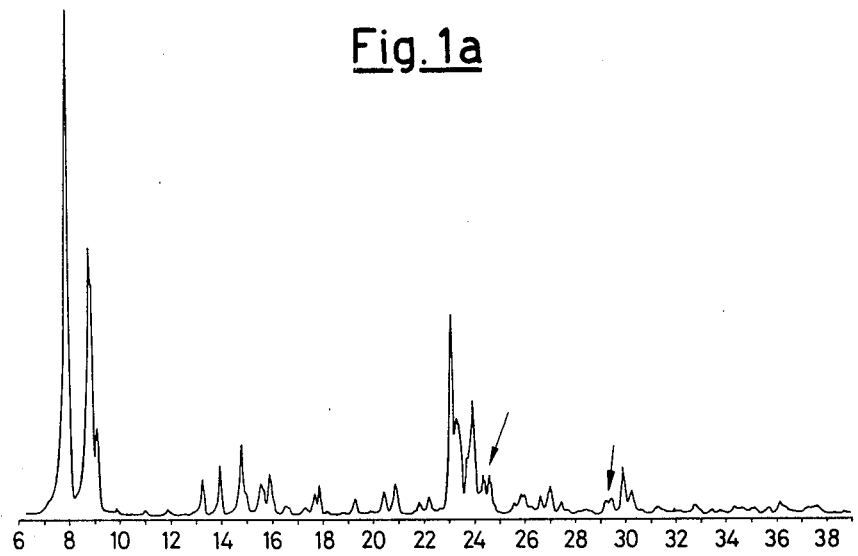

United States Patent [19]

Taramasso et al.

[11] 4,410,501
[45] Oct. 18, 1983

[54] PREPARATION OF POROUS CRYSTALLINE SYNTHETIC MATERIAL COMPRISED OF SILICON AND TITANIUM OXIDES

[75] Inventors: Marco Taramasso, San Donato Milanese; Giovanni Perego, Milan; Bruno Notari, San Donato Milanese, all of Italy

[73] Assignee: Snamprogetti S.p.A., Milan, Italy

[21] Appl. No.: 393,379

[22] Filed: Jun. 29, 1982

Related U.S. Application Data

[63] Continuation of Ser. No. 208,420, Nov. 19, 1980, abandoned.

[30] Foreign Application Priority Data

Dec. 21, 1979 [IT] Italy ............................... 28323 A/79

[51] Int. Cl.³ ............................................. C01B 33/20
[52] U.S. Cl. .................................... 423/326; 502/242; 423/332
[58] Field of Search .............................. 423/326–333; 252/431 N, 454, 455 Z; 260/429.5

[56] References Cited

U.S. PATENT DOCUMENTS

| | | | |
|---|---|---|---|
| 3,329,482 | 7/1967 | Young | 423/326 X |
| 3,941,871 | 3/1976 | Dwyer et al. | 423/326 |
| 3,972,983 | 8/1976 | Ciric | 423/328 |
| 4,061,724 | 12/1977 | Grose et al. | 423/335 |
| 4,104,294 | 8/1978 | Grose et al. | 260/448 C |
| 4,208,305 | 6/1980 | Kouwenhoven et al. | 423/329 X |
| 4,331,641 | 5/1982 | Hinnenkamp et al. | 423/326 X |

*Primary Examiner*—Edward J. Meros
*Attorney, Agent, or Firm*—Ralph M. Watson

[57] ABSTRACT

This invention relates to a porous crystalline synthetic material constituted by silicon and titanium oxides, a method for synthesizing said material, and the use thereof as a catalyst.

Said material is given the name titanium silicalite or TS-1, and corresponds to the following formula:

$$xTiO_2 \cdot (1-x)SiO_2$$

where x lies between 0.0005 and 0.04, preferably between 0.01 and 0.025.

The material is prepared starting from a mixture constituted by a source of silicon oxide and a source of titanium oxide. The reaction takes place in the aqueous phase at a temperature of 130° to 200° C., and the solid product obtained is calcined in air at 550° C.

The TS-1 can be used for alkylation of toluene with methanol, or benzene with ethylene or ethanol, disproportioning of toluene to produce paraxylol, for cracking, hydrocracking, isomerization of n-paraffins and naphthenes, reforming, isomerization of substituted polyalkyl aromatics, disproportioning of aromatics, conversion of dimethylether and/or methanol or other alcohols to hydrocarbons, polymerization of compounds containing olefine or acetylene bonds, conversion of aliphatic carbonyl compounds into at least partly aromatic hydrocarbons, separation of ethyl benzene from other $C_8$ aromatic hydrocarbons, hydrogenation and dehydrogenation of hydrocarbons, methanation, oxidation, dehydration of aliphatic compounds containing oxygen, and conversion of olefines into compounds of high octane number.

7 Claims, 5 Drawing Figures

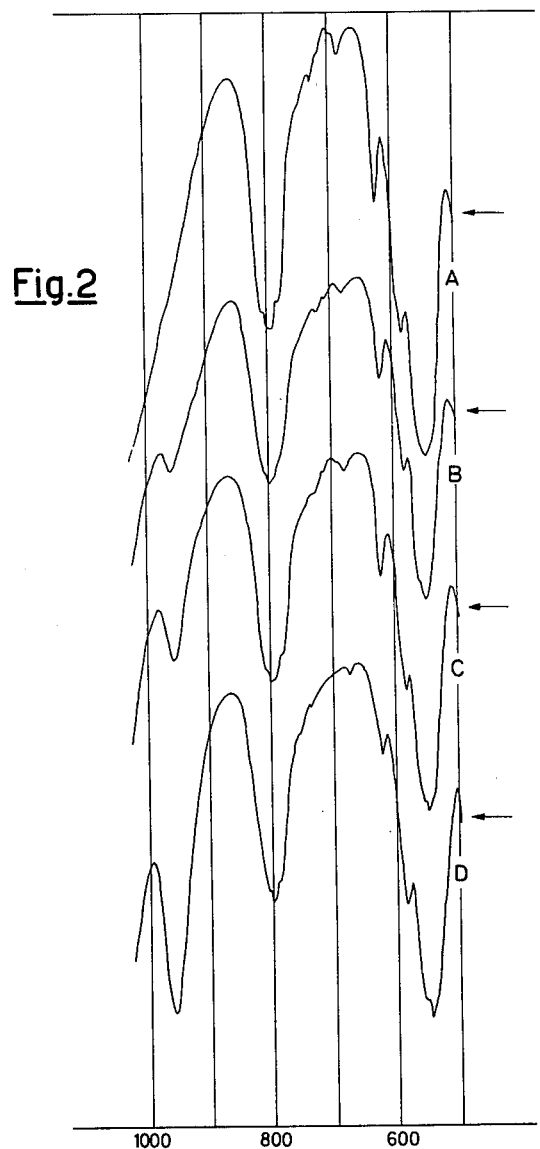

PREPARATION OF POROUS CRYSTALLINE SYNTHETIC MATERIAL COMPRISED OF SILICON AND TITANIUM OXIDES

This is a continuation of application Ser. No. 208,420, filed Nov. 19, 1980, now abandoned.

This invention relates to a porous crystalline synthetic material constituted by silicon and titanium oxides, a method for its preparation, and its uses.

Hereinafter in the description, said synthetic material will be known as titanium silicalite, or more briefly TS-1. U.S. Pat. No. 3,329,481 describes zeolites containing titanium, which are prepared from siliceous materials and inorganic titanium compounds in the absence of organic bases. "Silicalite", a zeolite structure constituted by pure crystalline $SiO_2$, has been described by Flanigen E. M. and others (Nature 271, 512 (1978)).

A crystalline porous silica having a structure of silicalite type in which the titanium is mentioned, among many other metals, as modifier, is described in the U.S. patent appln. Ser. No. 46,923 filed on June 8, 1979.

The same patent application describes an embodiment in which the amount of titanium is about 3.11 mol % with respect to the silica.

Within the composition range of 0.0001–1 $TiO_2$.1 $SiO_2$ described in the aforesaid patent application, a composition range has now been found which enables a titanium silicalite to be obtained having surprising catalytic properties in those reactions in which said catalysts are used.

The composition range of the titanium silicalite according to the present invention, expressed in terms of molar reagent ratios, is as follows:

|  | Molar reagent ratio | Preferably |
|---|---|---|
| $SiO_2/TiO_2$ | 5–200 | 35–65 |
| $OH^-/SiO_2$ | 0.1–1.0 | 0.3–0.6 |
| $H_2O/SiO_2$ | 20–200 | 60–100 |
| $Me/SiO_2$ | 0.0–0.5 | 0 |
| $RN^+/SiO_2$ | 0.1–2.0 | 0.4–1.0 |

$RN^+$ indicates the nitrogenated organic cation deriving from the organic base use for preparing the titanium silicalite according to the invention.

Me is an alkaline ion, preferably Na or K.

The final TS-1 has a composition corresponding to the formula $xTiO_2.(1-x)SiO_2$, where x lies between 0.0001 and 0.04, preferably between 0.01 and 0.025. The TS-1 is of the silicalite type, and all the titanium substitutes the silicon. The synthetic material according to the invention has characteristics which are demonstrated by a X-ray and infrared examination.

Figure 1B:
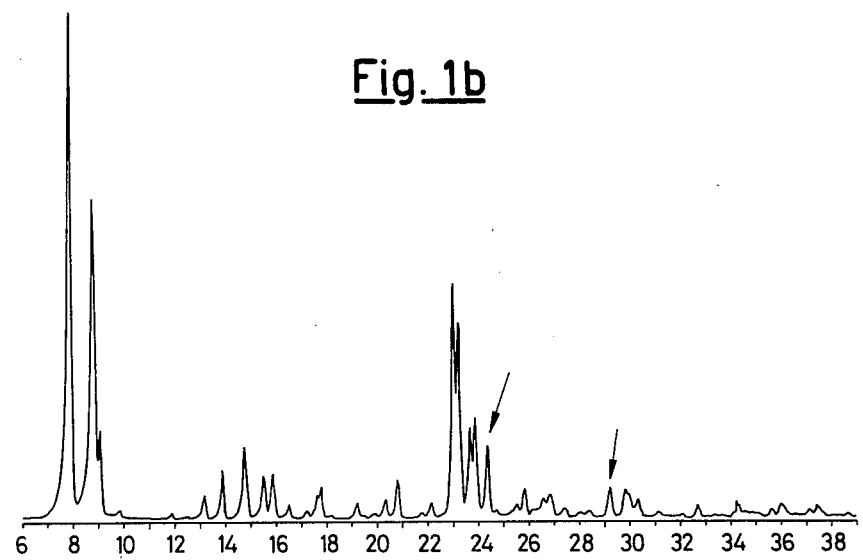

The X-ray examination is carried out by means of a powder diffractometer provided with an electronic pulse counting system, using $CuK_\alpha$ radiation. The products according to the present invention are characterised by an X-ray diffraction spectrum as shown in FIG. 1b. This spectrum is similar overall to the typical silicalite spectrum (FIG. 1a), however it comprises some clearly "single" reflections where evident double reflections are present in the pure silicalite spectrum. As the spectral differences between TS-1 and silicalite are relatively small, particular care is required in the spectral determination. For this reason, TS-1 and silicalite were examined by the same apparatus using $\alpha Al_2O_3$ as the internal standard.

Table 1 shows the most significant spectral data for a TS-1 with x=0.017, and a pure silicalite.

The elementary crystalline cell constants were determined by the method of minimum squares, on the basis of the interplanar distances of 7–8 single reflections within the range of 10°–40° for $2\theta$.

A large proportion of the interplanar distances for the TS-1 are, even though slightly, tendentially greater than the corresponding distances for the pure silicalite, in accordance with the higher foreseeable value of the Ti—O bond distance with respect to that of the Si—O bond distance.

Passage from double reflection to a single reflection is interpreted as a change from a monoclinic symmetry (pseudo orthorhombic) (silicalite) to an effective orthorhombic symmetry (titanium silicalite (TS-1)). The arrows in FIGS. 1a and 1b indicate the more apparent of the aforegoing spectral differences.

Passage from the monoclinic structure (silicalite) to the orthorhombic structure takes place above a titanium concentration of the order of 1%.

However, both the elementary cell volume and the intensity of a characteristic IR absorption band (see hereinafter) clearly demonstrate the continuity of the substitution phenomenon (see FIGS. 3a and 3b).

Infrared examination

TS-1 shows a characteristic absorption band at about 950 cm$^{-1}$ (see FIG. 2, spectra B, C and D) which is not present in the pure silicalite spectrum (FIG. 2, spectrum A), and is absent in titanium oxides (rutile, anatase) and in the alkaline titanates.

Spectrum B is that of the TS-1 containing 5 mol % of $TiO_2$. Spectrum C is that of the TS-1 containing 8 mol % of $TiO_2$. Finally, spectrum D is that of the TS-1 containing 2.3 mol % of $TiO_2$.

As can be seen from FIG. 2, the intensity of the band at about 950 cm$^{-1}$ increases with the quantity of titanium which substitutes the silicon in the silicalite structure.

Morphology

In morphological terms, TS-1 is in the form of parallelepipeds with rounded edges. A X-ray microprobe examination has demonstrated that the titanium distribution within the crystal is perfectly uniform, thus confirming that the titanium substitutes the silicon in the silicalite structure, and is not present in other forms.

Adsorption

The adsorption isotherm determined by the BET method with $O_2$ shows that TS-1 has the typical behaviour of a molecular sieve with a pore volume saturation capacity of 0.16–0.18 cm$^3$ g$^{-1}$.

This property makes TS-1 suitable for use as an adsorbent with hydrophobic characteristics.

The chemical and catalytic properties of TS-1 can be modified by introducing other substituting elements such as B, Al, Fe etc. during the synthesis stage.

The present invention also relates to a method for preparing the synthetic material constituted by silicon and titanium oxides.

In the aforesaid patent application is described a method for preparing a silicon and titanium oxide-based material using 30% hydrogen peroxide solution to allow solubilisation of the titanium compounds in a basic environment.

It has been found that the addition of the hydrogen peroxide solution is not necessary under certain conditions, and thus the preparation method for the material according to the invention is greatly simplified.

The method for preparing TS-1 comprises the preparation of a reaction mixture constituted by sources of silicon oxide and titanium oxide, and possibly an alkaline oxide, a nitrogenated organic base and water, having a reagent molar ratio composition as heretofore defined.

The silicon oxide source can be a tetraalkylorthosilicate, preferably tetraethylorthosilicate, or simply a silica in colloidal form, or again a silicate of an alkaline metal, preferably Na or K.

The titanium oxide source is a hydrolysable titanium compound chosen preferably from $TiCl_4$, $TiOCl_2$, and $Ti(alkoxy)_4$, preferably $Ti(OC_2H_5)_4$.

The organic base is a tetraalkylammonium hydroxide, in particular tetrapropylammonium hydroxide.

The reagent mixture is subjected to hydrothermal treatment in an autoclave at a temperature of between 130° and 200° C., under its own pressure, for a time of 6-30 days until the crystals of the TS-1 precursor are formed. These are separated from the mother solution, carefully washed with water and dried.

In the anhydrous state they have the following composition: $xTiO_2 \cdot (1-x)SiO_2 \cdot \sim 0.04(RN^+)_2O$. The precursor crystals are heated for 1 to 72 hours in air at 550° C. in order to completely eliminate the nitrogenated organic base. The final TS-1 has the composition: $xTiO_2 \cdot (1-x)SiO_2$ where x is as heretofore defined. Chemical-physical examinations are carried out on the products thus obtained. The uses of the titanium silicalite according to the invention are in particular the following:

(1) alkylation of benzene with ethylene or ethanol, and alkylation of toluene with methanol
(2) disproportioning of toluene to produce paraxylol
(3) cracking and hydrocracking
(4) isomerisation of n-paraffins and naphthenes
(5) reforming
(6) isomerisation of substituted polyalkyl aromatics
(7) disproportioning of aromatics
(8) conversion of dimethylether and/or methanol or other low molecular weight alcohols into hydrocarbons
(9) polymerisation of compounds which contain olefine or acetylene bonds
(10) conversion of aliphatic carbonyl compounds into at least partly aromatic hydrocarbons
(11) separation of ethylbenzene from other aromatic C8 hydrocarbons
(12) hydrogenation and dehydrogenation of hydrocarbons
(13) methanation
(14) oxidation
(15) dehydration of aliphatic compounds containing oxygen
(16) conversion of olefines into compounds of high octane number.

Some examples are given hereinafter in order to better illustrate the invention, but without limiting it in any way.

EXAMPLE 1

This example illustrates the preparation of TS-1 with a high degree of purity.

455 g of tetraethylorthosilicate are placed in a pyrex glass vessel fitted with a stirrer and kept under a $CO_2$-free atmosphere, and 15 g of tetraethyltitanate are added followed gradually by 800 g of a 25% weight solution of tetrapropylammonium hydroxide (free from inorganic alkali). The mixture is kept stirred for about one hour, then heating is commenced carefully in order to accelerate hydrolysis and evaporate the ethyl alcohol which is released.

After about 5 hours at 80°-90° C., the alcohol has been completely eliminated. The volume is increased to 1.5 liters with distilled water, and the opalescent homogeneous solution is transferred to a titanium autoclave fitted with a stirrer. The mixture is heated to 175° C., and is kept stirred at this temperature under its own pressure for a time of ten days. When the treatment is finished, the autoclave is cooled, the contents are discharged, and the mass of fine crystals obtained is recovered. This is carefully washed on a filter with hot distilled water many times.

The product is then dried and finally calcined at 550° C. for six hours.

The X-ray diffraction spectrum for the calcined product corresponds to that of the TS-1 given in FIG. 1b and Table 1.

EXAMPLE 2

This example illustrates the preparation of TS-1 using tetrapropylammonium peroxytitanate as the titanium oxide source.

The pertitanates are known to be stable in a strongly basic solution.

150 g of tetraethyltitanate are hydrolysed by slowly dripping into 2.5 liters of distilled water under stirring. A white gelatinous suspension is obtained. It is cooled to 5° C. and 1.8 liters of 30% hydrogen peroxide, also cooled to 5° C., are added, then stirring occasionally over two hours while maintaining the temperature low. A clear orange-coloured solution is obtained. At this point, 2.4 liters of a 25% aqueous tetrapropylammonium hydroxide solution pre-cooled to 5° C. are added. After one hour, 500 g of Ludox colloidal silica containing 40% of $SiO_2$ are added, mixing is carried out carefully, and the mixture left standing overnight at ambient temperature. It is finally heated under stirring to 70°-80° C. for 6-7 hours. The mixture thus obtained is transferred to an autoclave, and the operations described in example 1 are then carried out.

The final product when under X-ray examination is found to be properly crystallised pure TS-1.

EXAMPLES 3-7

Operating under the conditions described in example 2, five preparations were made in which the molar ratios of the reagents (expressed as $SiO_2/TiO_2$) and the tetrapropylammonium quantity (expressed as $RN^+/SiO_2$) were varied. The results of the chemical analysis, the variation in lattice volume and the IR absorbency ratio for the bands at 950 $cm^{-1}$ (Ti) and at 800 $cm^{-1}$ (Si) are summarised in table 2.

Figure 3A:
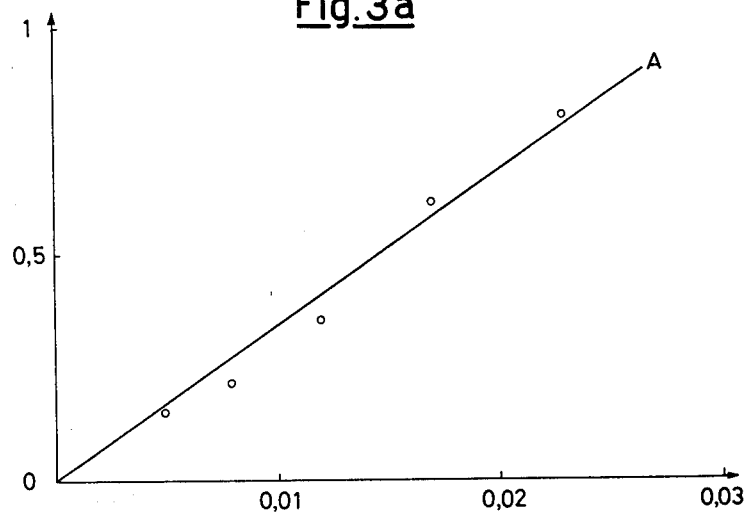
Figure 3B:
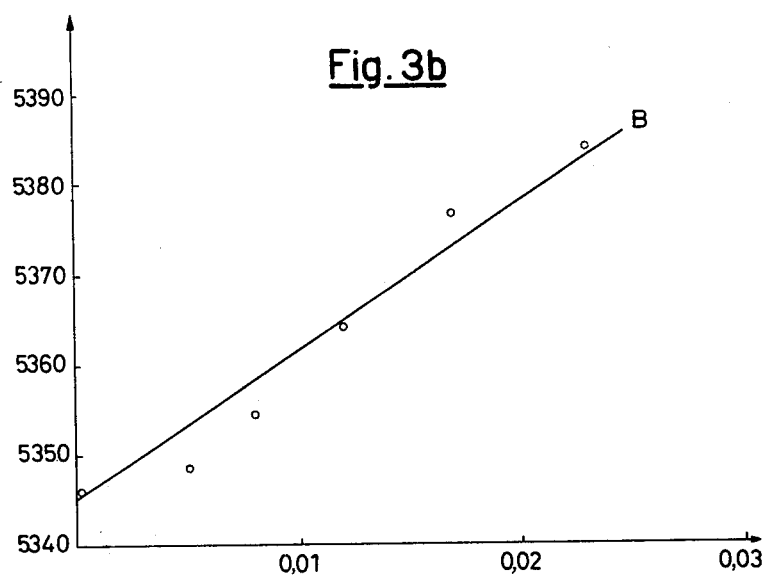

FIGS. 3a and 3b show respectively the variation of the ratio between the intensities of the IR absorption bands and the variation of the lattice volumes.

The abscissa in this figures represents the content x of $TiO_2$ expressed in mol %.

The point O on the abscissa corresponds to the aforesaid values for pure silicalite. The approximately linear variation of both the aforesaid quantities as the titanium concentration varies can be seen.

EXAMPLE 8

This example illustrates how the acid properties of TS-1 are considerably influenced by the introduction of traces of aluminum.

Operating exactly as in example 2, 4.27 g of $NaAlO_2$ were previously added to the 500 g of Ludox colloidal silica (molar reagent ratio $SiO_2/Al_2O_3=128$). Although the TS-1 obtained does not show appreciable differences under X-ray examination from that obtained in example 2, it shows in the $H^+$ form a considerably increased acidity (passing from a concentration of $1.10^{-3}$ meq $H^+/g$ for the TS-1 to a concentration of 0.5 meq $H^+/g$ for the sample doped with aluminium).

EXAMPLE 9

This example illustrates how the acidity of TS-1 is influenced by the introduction of boron.

Operating exactly as in example 2, 40 g of boric acid dissolved in 35 g of KOH were added to the Ludox silica. The acidity of the final product is 0.8–1 meq $H^+/g$.

In this case, the simultaneous substitution by the boron and titanium is demonstrated by IR examination. Besides the Ti band at 950 cm$^{-1}$, the characteristic band of boron in tetrahedral coordination is clearly visible at 920 cm$^{-1}$.

EXAMPLE 10

5.8 g of allyl alcohol were added to a solution of tertiary butyl alcohol (80 cc) containing 64 g of a 6.3% hydrogen peroxide solution in anhydrous tertiary butyl alcohol. 2 g of TS-1 catalyst (2 mol % $TiO_2$) were added to this mixture, and the resultant mixture was stirred at ambient temperature. After 12 hours the reaction mixture was filtered, and the solvent distilled off under vacuum.

The purified residue contained 8 g of glycerin with a yield of 86%.

TABLE 1

| 2θ (CuK⁻α) | TS-1 Interplanar distance, d(A) | Rel. Int.[b] | 2θ (CuK⁻α) | Silicalite[a] Interplanar distance, d(A) | Rel. Int.[b] |
|---|---|---|---|---|---|
| 7.94 | 11.14 | vs | 7.94 | 11.14 | vs |
| 8.85 | 9.99 | s | 8.85 | 9.99 | s |
| 9.08 | 9.74 | m | 9.08 | 9.74 | m |
| 13.21 | 6.702 | w | 13.24 | 6.687 | w |
| 13.92 | 6.362 | mw | 13.95 | 6.348 | mw |
| 14.78 | 5.993 | mw | 14.78 | 5.993 | mw |
| 15.55 | 5.698 | w | 15.55 | 5.698 | w* |
| 15.90 | 5.574 | w | 15.90 | 5.574 | w |
| 17.65 | 5.025 | w | 17.65 | 5.025 | w |
| 17.81 | 4.980 | w | 17.83 | 4.975 | w |
| 20.37 | 4.360 | w | 20.39 | 4.355 | w |
| 20.85 | 4.260 | mw | 20.87 | 4.256 | mw |
| 23.07 | 3.855 | s | 23.08 | 3.853 | s |
| | | | 23.28 | 3.821 | ms |
| 23.29 | 3.819 | s | | | |
| | | | 23.37 | 3.806 | ms |
| | | | 23.71 | 3.753 | ms |
| 23.72 | 3.751 | s | | | |
| | | | 23.80 | 3.739 | ms |
| 23.92 | 3.720 | s | 23.94 | 3.717 | s |
| | | | 24.35 | 3.655 | mw |
| 24.41 | 3.646 | m | | | |
| | | | 24.60 | 3.619 | mw |
| | | | 25.84 | 3.448 | w |
| 25.87 | 3.444 | w | | | |
| | | | 25.97 | 3.431 | w |
| 26.87 | 3.318 | w* | 26.95 | 3.308 | w* |
| | | | 29.23 | 3.055 | w |
| 29.27 | 3.051 | mw | | | |
| | | | 29.45 | 3.033 | w |
| 29.90 | 2.988 | mw | 29.90 | 2.988 | mw |
| 30.34 | 2.946 | w | 30.25 | 2.954 | w |
| 45.00 | 2.014 | mw* | 45.05 | 2.012 | mw* |
| 45.49 | 1.994 | mw* | 45.60 | 1.989 | mw* |

[a] prepared by the method of U.S. Pat. No. 4,061,724. Product calcined at 550° C.
[b] vs: very strong; s: strong; ms: medium strong; m: medium; mw: medium weak; w: weak; *: multiplet

TABLE 2

| EXAMPLE | | 3 | 4 | 5 | 6 | 7 |
|---|---|---|---|---|---|---|
| $SiO_2/TiO_2$ (reagents) | | 133 | 66 | 33 | 5 | 5 |
| $RN^+SiO_2$ (reagents) | | 0.21 | 0.21 | 0.22 | 0.89 | 2 |
| x (chemical analysis) | | 0.005 | 0.008 | 0.012 | 0.017 | 0.023 |
| Int.(950 cm$^{-1}$)/Int.(800 cm$^{-1}$) | | 0.15 | 0.21 | 0.35 | 0.61 | 0.80 |
| Elementary cell constants[a] | a, A | 20.102(3) | 20.121(4) | 20.126(3) | 20.126(6) | 20.133(5) |
| | b, A | 19.896(12) | 19.900(4) | 19.902(3) | 19.923(4) | 19.933(3) |
| | c, A | 13.373(3) | 13.373(3) | 13.393(3) | 13.410(3) | 13.416(3) |
| | α, ° | 90.46(1) | 90.58(1) | | | |
| Elementary cell volume V, A$^3$ | | 5348.5 | 5354.3 | 5364.7 | 5376.7 | 5384.0 |

[a] The standard deviations referring to the last figure given are shown in parentheses. When the value of α is not indicated, this signifies orthorhombic symmetry. The elementary cell constants for the pure silicalite are:
a = 20.117(5); b = 19.874(5); c = 13.371(4)A; α = 90.62(1)°; V = 5345.5 A$^3$.

We claim:
1. The method of preparing a porous, crystalline material comprised of silicon oxide and titanium oxide wherein the ratio of said oxides is represented by the formula

$$xTiO_2 \cdot (1-x)SiO_2$$

in which x is a number between 0.0005 and 0.04, which comprises the steps of:
(1) preparing an aqueous mixture of starting reagents free from alkali- and alkaline-earth metals including a source of silicon oxide selected from the group consisting of silica gel and tetraalkylorthosilicates, a source of titanium oxide consisting of a hydrolysable titanium compound, and a nitrogenated organic base, and wherein the starting reagents have the following molar ratios:
$SiO_2/TiO_2$ from 5 to 200,
$OH^-/SiO_2$ from 0.1 to 1.0,
$H_2O/SiO_2$ from 20 to 200,
$RN^+/SiO_2$ from 0.1 to 2.0
wherein $RN^+$ is the cation of the nitrogenated organic base, (2) subjecting said mixture to hydrothermal treatment in an autoclave at a temperature in the range of 130° to 200° centrigrade under its own pressure for a period of 6 to 30 days to obtain crystals and a mother liquor, (3) separating said crystals from the mother liquor, (4) washing the separated crystals with water and then drying the same, and (5) heating the dried crystals in air so as to calcine the same and eliminate said nitrogenated base therefrom.

2. A method as claimed in claim 1, wherein the hydrolysable titanium compound is a member of the group consisting of $TiCl_4$, $TiOCl_2$ and $Ti(alkoxy)_4$.

3. A method as claimed in claim 2, wherein $Ti(alkoxy)_4$ is $Ti(OC_2H_5)_4$.

4. A method as claimed in claim 1, wherein the nitrogenated organic base is tetraalkylammonium hydroxide.

5. A method as claimed in claim 1, wherein x is a number between 0.01 and 0.025.

6. A method as claimed in claim 4, wherein the nitrogenated organic base is tetrapropylammonium hydroxide.

7. A method as claimed in claim 1, wherein the molar ratios of the starting reagents are:

$SiO_2/TiO_2$ from 35 to 65,
$OH^-/SiO_2$ from 0.03 to 0.6,
$H_2O/SiO_2$ from 60 to 100,
$RN^+/SiO_2$ from 0.4 to 1.0.

* * * * *